(No Model.)
W. G. RANKIN.
BICYCLE BELL.
No. 590,593. Patented Sept. 28, 1897.
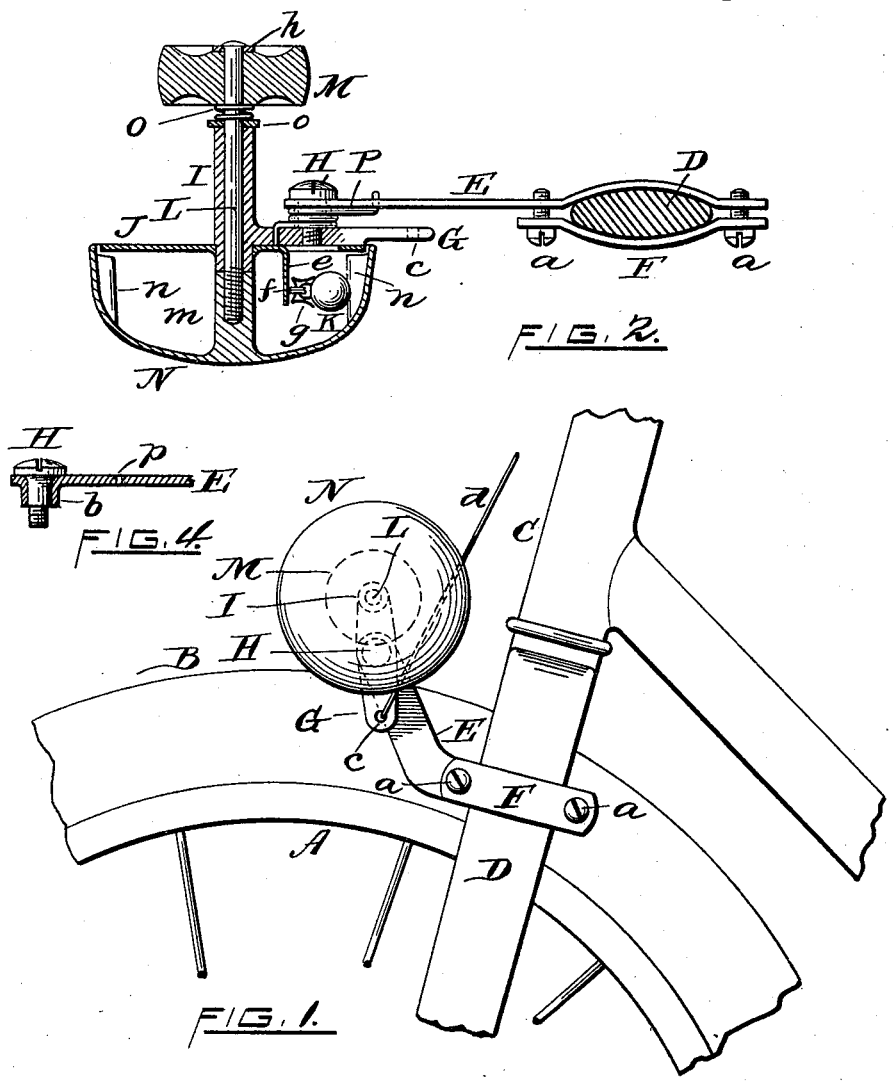
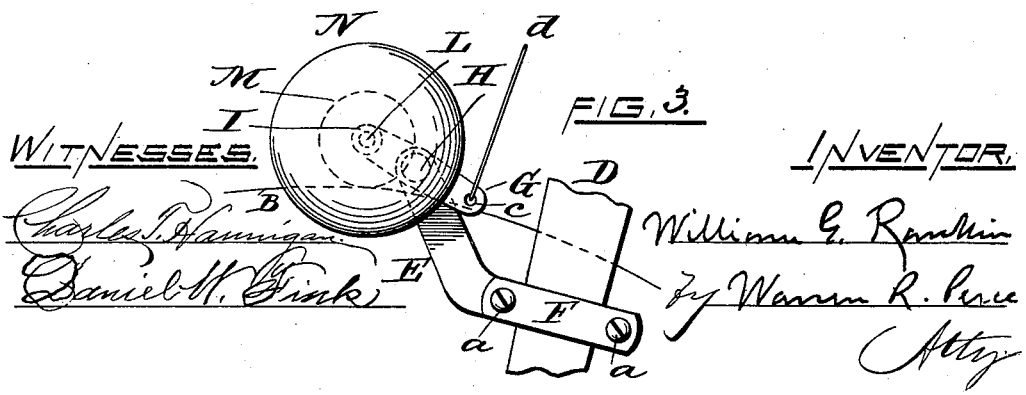

UNITED STATES PATENT OFFICE.

WILLIAM G. RANKIN, OF PROVIDENCE, RHODE ISLAND, ASSIGNOR TO ZENAS W. BLISS, OF CRANSTON, RHODE ISLAND.

BICYCLE-BELL.

SPECIFICATION forming part of Letters Patent No. 590,593, dated September 28, 1897.

Application filed January 25, 1897. Serial No. 620,504. (No model.)

*To all whom it may concern:*

Be it known that I, WILLIAM G. RANKIN, of the city and county of Providence, in the State of Rhode Island, have invented a certain new and useful Improvement in Bicycle-Bells; and I declare the following to be a specification thereof, reference being had to the accompanying drawings.

Like letters indicate like parts.

Figure 1 is a side elevation of my improved bicycle-bell and of such parts of a bicycle as are in relation thereto. Fig. 2 is a diametrical section of said improved bell with the striker and clamping attachment in top plan. Fig. 3 is the same view of the bell and its supports as Fig. 1, except that in Fig. 3 the bell is shown in operative position in contact with the tire of a bicycle-wheel. Fig. 4 is a detail view.

My invention relates to bicycle-bells; and it consists of the combination of a clamping-arm having a supporting-screw with a lever centrally mounted on said supporting-screw and provided with a tubular journal extending at a right angle across its inner end, a disk or plate fastened upon said lever and tube and having a tongue cut therefrom extending inwardly to support a clapper, and a shaft or rod rotatably mounted in said tubular journal and having at one end thereof a gong secured thereto and at the other end a friction-roller secured thereto and adapted to turn said shaft and gong by its revolution while in contact with the tire of the bicycle-wheel when running.

In the drawings, A is the front wheel of a bicycle, and B the tire thereof.

C is the steering-head, and D one of the forks. Upon the fork D the bent arm E is secured by the clamp F, and $a$ $a$ are the clamping-screws. The arm E has at its end an opening and a short barrel $b$, Fig. 4.

G is a lever-arm mounted centrally upon the screw-threaded end of the supporting-screw H, which passes through said arm E. At the outer end the lever-arm G has a hole $c$, through which a cord or wire $d$ passes, and at the inner end of said lever-arm is a sleeve or tubular bearing I extending crosswise. A disk or plate J is brazed or otherwise secured to the lever-arm G and sleeve I. A tongue $e$ is cut from said disk or plate and bent inwardly. At the end of the tongue it is perforated, and a spring-loop $f$ is secured thereto, upon which a button-shaped clapper K is mounted. A short rubber tube $g$ keeps the clapper K properly extended, but affords a flexible support.

In the sleeve or tubular bearing I is loosely mounted a rod or shaft L, screw-threaded at its end. Said shaft L is longer than the sleeve or tube I, and at its outer end a friction-roller M is fastened. A washer $h$ and the heading of the shaft prevent the removal of said roller M. At the inner or threaded end of the shaft L is mounted a gong N, having an inner central hub $m$ to receive said end of the shaft. On the inner surface of the gong N are the projections $n$ $n$. A spiral spring O surrounds the shaft L and has one end bearing against the roller M and the other end bearing against the washer $o$. Said spring serves to prevent rattling and also to take up the wear. A spiral spring P wound around the barrel $b$ has one of its ends bent and engaged in a hole $p$ of the arm E and the other end bent and engaged in a hole in the lever-arm G.

In Fig. 1 the position of the bell is shown when not in use, in which it is seen that the roller (shown in dotted lines) is above the tire B and is held in such elevated position by force of the spring P; but by pulling the wire or cord $d$ the force of the spring P is overcome and the lever-arm G is brought from the position shown in Fig. 1 to the position shown in Fig. 3, where it is seen that the roller M has been brought into rolling contact with the tire B.

The revolution of the bicycle-wheel A causes the friction-roller M while in contact with the tire B to rotate, thereby turning the shaft L in the tubular journal I, and with it the gong N, mounted on said shaft. The gong N in turning brings its projections $n$ $n$ forcibly against the flexibly-hung clapper K and is rung thereby. When the pull on the cord or wire $d$ is released, the spring P automatically lifts the roller M out of contact with the wheel-tire and so stops the striking of the gong.

I claim as a novel and useful invention and desire to secure by Letters Patent—

1. In a bicycle-bell, the combination of a fixed support having a journal or bearing, a shaft rotatably mounted in said journal or bearing and having a gong fastened at one end thereof and a friction-roller fastened at the other end thereof, which roller is rotatable while in contact with the tire of a bicycle-wheel, when in motion, together with a striking device, mounted on a fixed support and adapted to strike at intervals upon said gong, substantially as described.

2. In a bicycle-bell, the combination of a fixed support having a journal or bearing, a rotatable gong fastened upon a shaft mounted in said journal or bearing, a friction-roller fastened to said shaft and rotatable therewith by its frictional contact with a bicycle-wheel which is in motion, a striking device mounted upon a fixed support, and projections from the gong adapted to be brought into contact with the striking device by the rotation of the gong, substantially as specified.

3. The improved bicycle-bell herein described consisting of a bent arm E, with a clamp F secured thereto, adapted to hold said arm upon a bicycle-frame, a supporting screw or stud H at the end of said arm, a lever-arm G mounted midway upon said screw or stud, a spiral spring fastened at one end to said lever-arm and at its other end to said bent arm, a tube or sleeve I across the end of the lever-arm G, a disk or plate J, fastened to said lever-arm and sleeve and having an inwardly-bent tongue, a clapper K flexibly supported by said tongue, a rotatable shaft L mounted in said sleeve or tube, a friction-roller M fastened to the shaft at its outer end and a gong N fastened by a central hub to the shaft at its inner end and provided with lips or projections n, n, adapted to strike against said clapper by the revolution of the gong, substantially as set forth.

WILLIAM G. RANKIN.

Witnesses:
WARREN R. PERCE,
DANIEL W. FINK.